US008463003B2

United States Patent
Otsubo et al.

(10) Patent No.: US 8,463,003 B2
(45) Date of Patent: Jun. 11, 2013

(54) BIOMETRIC INFORMATION ACQUISITION APPARATUS, BIOMETRIC AUTHENTICATION APPARATUS, LIGHT GUIDE, AND IMAGE ACQUISITION APPARATUS

(75) Inventors: Hiroyasu Otsubo, Watari-gun (JP);
Akito Sakemoto, Watari-gun (JP);
Masaki Yamazaki, Watari-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 156 days.

(21) Appl. No.: 13/058,418

(22) PCT Filed: Dec. 2, 2009

(86) PCT No.: PCT/JP2009/006552
§ 371 (c)(1),
(2), (4) Date: Feb. 10, 2011

(87) PCT Pub. No.: WO2010/067545
PCT Pub. Date: Jun. 17, 2010

(65) Prior Publication Data
US 2011/0142296 A1    Jun. 16, 2011

(30) Foreign Application Priority Data
Dec. 8, 2008 (JP) .................................. 2008-312629

(51) Int. Cl.
*G06K 9/00* (2006.01)

(52) U.S. Cl.
USPC ............................ 382/127; 348/337; 382/218

(58) Field of Classification Search
USPC .................. 348/337, 340; 382/115, 124, 126, 382/127
See application file for complete search history.

(56) References Cited

U.S. PATENT DOCUMENTS

| 4,924,085 | A   |   | 5/1990 | Kato et al. |
| 5,619,586 | A   | * | 4/1997 | Sibbald ........................... 382/127 |
| 5,732,148 | A   | * | 3/1998 | Keagy et al. .................... 382/124 |
| 6,917,695 | B2  | * | 7/2005 | Teng et al. ...................... 382/126 |
| 7,106,526 | B2  | * | 9/2006 | Tomita et al. ................... 359/726 |

(Continued)

FOREIGN PATENT DOCUMENTS

JP    A-2-176984    7/1990
JP    A-4-78979     3/1992

(Continued)

OTHER PUBLICATIONS

International Preliminary Report on Patentability dated Jul. 5, 2011 in International Application No. PCT/JP2009/006552.

(Continued)

*Primary Examiner* — Gregory M Desire
(74) *Attorney, Agent, or Firm* — Oliff & Berridge, PLC

(57) ABSTRACT

A biometric information acquisition apparatus includes: a light guide that guides a light beam through a plurality of light reflective surfaces; and an image pickup unit that receives the light beam output from the light guide and captures a subject image. The light guide includes an input surface that receives the subject image and is provided at a front surface side; a first light reflective surface that is opposed to the input surface and is provided at a back surface side; and a second light reflective surface that extends in a thickness direction of the light guide. A subject image can be acquired within a desired range by employing the light guide, while suppressing an increase in size of the biometric information acquisition apparatus.

10 Claims, 9 Drawing Sheets

U.S. PATENT DOCUMENTS

| | | | |
|---|---|---|---|
| 7,191,946 B2* | 3/2007 | Bidault et al. | 235/462.05 |
| 7,361,472 B2* | 4/2008 | Yguerabide et al. | 435/7.1 |
| 7,465,107 B2* | 12/2008 | Washisu et al. | 396/351 |
| 7,889,398 B2* | 2/2011 | Huang et al. | 358/475 |
| 8,180,119 B2* | 5/2012 | Kajihara et al. | 382/124 |
| 2001/0005004 A1 | 6/2001 | Shiratsuki et al. | |
| 2002/0150284 A1* | 10/2002 | Iwai | 382/124 |
| 2003/0038938 A1* | 2/2003 | Jung et al. | 356/419 |
| 2004/0264747 A1* | 12/2004 | Hata | 382/124 |
| 2007/0133847 A1* | 6/2007 | Ogura | 382/126 |
| 2008/0088731 A1* | 4/2008 | Tanaka et al. | 348/340 |
| 2008/0247613 A1* | 10/2008 | Chang | 382/124 |
| 2009/0039241 A1* | 2/2009 | Ueki | 250/227.14 |
| 2010/0220900 A1* | 9/2010 | Orsley | 382/124 |
| 2011/0142296 A1* | 6/2011 | Otsubo et al. | 382/115 |

FOREIGN PATENT DOCUMENTS

| | | |
|---|---|---|
| JP | A-5-298431 | 11/1993 |
| JP | A-9-259249 | 10/1997 |
| JP | A-2000-207539 | 7/2000 |
| JP | A-2001-119008 | 4/2001 |
| JP | A-2001-153630 | 6/2001 |
| JP | A-2006-198174 | 8/2006 |

OTHER PUBLICATIONS

International Search Report dated Dec. 28, 2009 in corresponding International Application No. PCT/JP2009/006552 (with translation).

\* cited by examiner

BIOMETRIC INFORMATION ACQUISITION APPARATUS, BIOMETRIC AUTHENTICATION APPARATUS, LIGHT GUIDE, AND IMAGE ACQUISITION APPARATUS

TECHNICAL FIELD

The present invention relates to a biometric information acquisition apparatus, a biometric authentication apparatus, a light guide, and an image acquisition apparatus.

BACKGROUND ART

With the recent enhancement of information security protection, the progress in the technical development relating to biometric authentication has been remarkable. The biometric authentication is a technique that distinguishes a certain individual from other individuals based on a determination as to whether the biometric information which is acquired from an inspection targeted individual matches prestored biometric information. For example, there are a method of identifying an individual based on the iris of a human pupil, a method of identifying an individual based on the vein pattern of a human finger or the like, a method of identifying an individual based on the fingerprint pattern of a finger, and so on.

In accordance with such a background, research and development are being vigorously made on a biometric information acquisition apparatus and a biometric authentication apparatus including the same. For example, Patent Literature 1 discloses a technique for authentication based on a plurality of images obtained sequentially in chronological order. Further, Patent Literature 2 discloses an image pickup apparatus which is used for the biometric authentication. In this image pickup apparatus, a light source (100), a support (300), and an image authentication unit (200) are stacked on top of each other, thereby reducing the size of the image pickup apparatus.

CITATION LIST

Patent Literature

PTL 1: Japanese Unexamined Patent Application Publication No. 2006-1981.74
PTL 2: Japanese Unexamined Patent Application Publication No. 2001419008

SUMMARY OF INVENTION

Technical Problem

Incidentally, in the case where the biometric authentication apparatus is embedded in a small electronic device (e.g., a laptop computer, a mobile phone), there is a strong demand for reduction in cost and size of the biometric information acquisition apparatus that functions as an image acquisition portion of the biometric authentication apparatus.

There is a case where the size of the biometric information acquisition apparatus would be reduced by providing an optical system in front of an image pickup device. In this case, in order to reduce the size of the image pickup device, it is preferable to transfer an image through a plurality of reflective surfaces included in the optical system and to reduce the image in this process. However, it is sometimes difficult to secure a space for arranging the optical system for image transfer within the electronic device. In such a case, the biometric information acquisition apparatus cannot be sufficiently reduced in size.

Solution to Problem

The present invention has been made to solve the above-mentioned problem, and therefore an object of the present invention is to capture a subject image within a desired range in a biometric information acquisition apparatus having an optical system for image transfer, while suppressing an increase in size of the biometric information acquisition apparatus.

A biometric information acquisition apparatus according to the present invention includes: a light guide that guides a light beam through a plurality of light reflective surfaces; and an image pickup unit that receives the light beam output from the light guide and captures a subject image, in which the light guide includes: an input surface that receives the subject image and is provided at a front surface side; a first light reflective surface that is opposed to the input surface and is provided at a back surface side; and a second light reflective surface that extends in a thickness direction of the light guide.

By employing this light guide, a subject image can be acquired within a desired range, while suppressing an increase in size of the biometric information acquisition apparatus.

It is preferable that the light guide include: a light beam introducing portion having the input surface and the first light reflective surface; and a light beam reflexing portion having the second light reflective surface and coupled to the light beam introducing portion.

It is preferable that the light guide further include a light exit surface from which a light beam reflected by the second light reflective surface is output to the image pickup unit, and that the light exit surface be a surface that extends in the thickness direction of the light guide and be opposed to the second light reflective surface.

It is preferable that the image pickup unit include: a lens opposed to the light exit surface; and an image pickup device that receives a light beam incident through the lens and captures the subject image.

It is preferable that the first and second light reflective surfaces form a part of an exterior surface of the light guide.

It is preferable that, when viewed from the top of the light guide, the light beam reflexing portion have a portion that becomes narrower as being away from the light beam introducing portion.

It is preferable that a light-absorbing layer be at least partially formed on a side surface of the light beam introducing portion along the thickness direction of the light guide.

It is preferable that a light-absorbing layer be at least partially formed on a side surface of the light beam reflexing portion along the thickness direction of the light guide, except for the second light reflective surface and the light exit surface.

A biometric authentication apparatus according to the present invention includes: a light guide that guides a light beam through a plurality of light reflective surfaces; an image pickup unit that receives the light beam output from the light guide and captures a subject image; and an authentication execution unit that executes authentication based on comparison between the subject image captured by the image pickup unit and a prestored image, in which the light guide includes: an input surface that receives the subject image and is provided at a front surface side; a first light reflective surface that is opposed to the input surface and is provided at a back surface side; and a second light reflective surface that extends in a thickness direction of the light guide.

A light guide according to the present invention guides a light beam through a plurality of light reflective surfaces and outputs the light beam to an image pickup device that captures a subject image by a plurality of pixels, the light guide including: an input surface that receives the subject image and is provided at a front surface side; a first light reflective surface that is opposed to the input surface and is provided a back surface side; and a second light reflective surface that extends in a thickness direction of the light guide.

An image acquisition apparatus according to the present invention includes: a light guide that guides a light beam through a plurality of light reflective surfaces; and an image pickup unit that receives the light beam output from the light guide and captures a subject image, in which the light guide includes: an input surface that receives the subject image and is provided at a front surface side; a first light reflective surface that is opposed to the input surface and is provided at a back surface side; and a second light reflective surface that extends in a thickness direction of the light guide.

Advantageous Effects of Invention

According to the present invention, a subject image may be captured within a desired range in a biometric information acquisition apparatus having an optical system for image transfer, while suppressing an increase in size of the biometric information acquisition apparatus.

DESCRIPTION OF EMBODIMENTS

Figure 1:
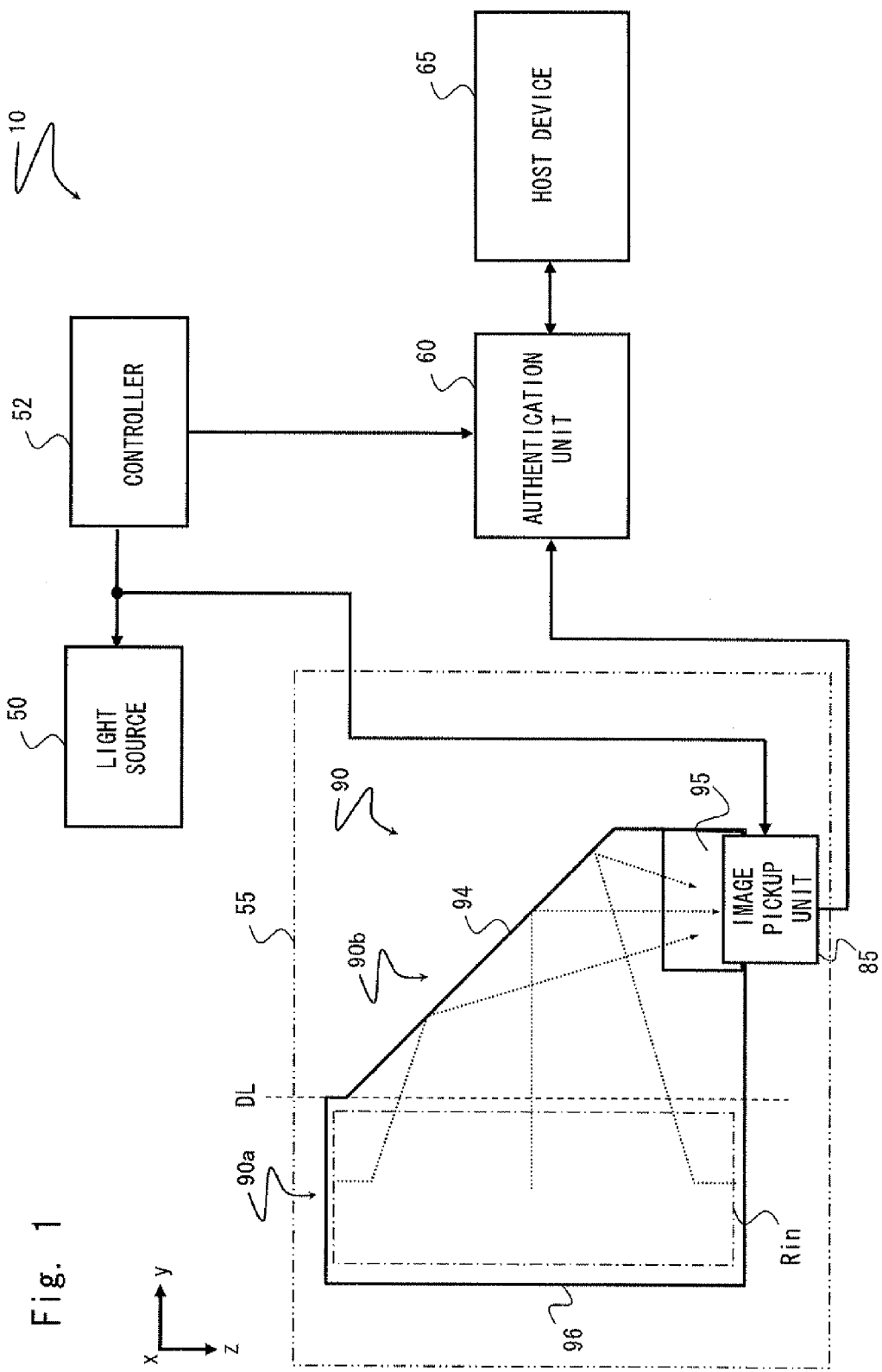
FIG. 1 is a schematic explanatory diagram showing a schematic structure of a biometric authentication apparatus according to a first embodiment of the present invention.

Hereinafter, embodiments of the present invention will be described with reference to the drawings. Each embodiment is simplified for the sake of convenience of explanation. The drawings are in simplified form, and the technical scope of the present invention should not be interpreted to be limited to the drawings. The drawings are shown only for the purpose of illustrating the technical concept of the present invention, and the components shown in the drawings are not to scale. Identical elements are denoted by identical reference numerals, and a redundant explanation thereof is omitted. Directional terms such as "upper", "lower", "left", and "right" are used assuming that the drawings are viewed in front.

First Embodiment

Figure 2A:
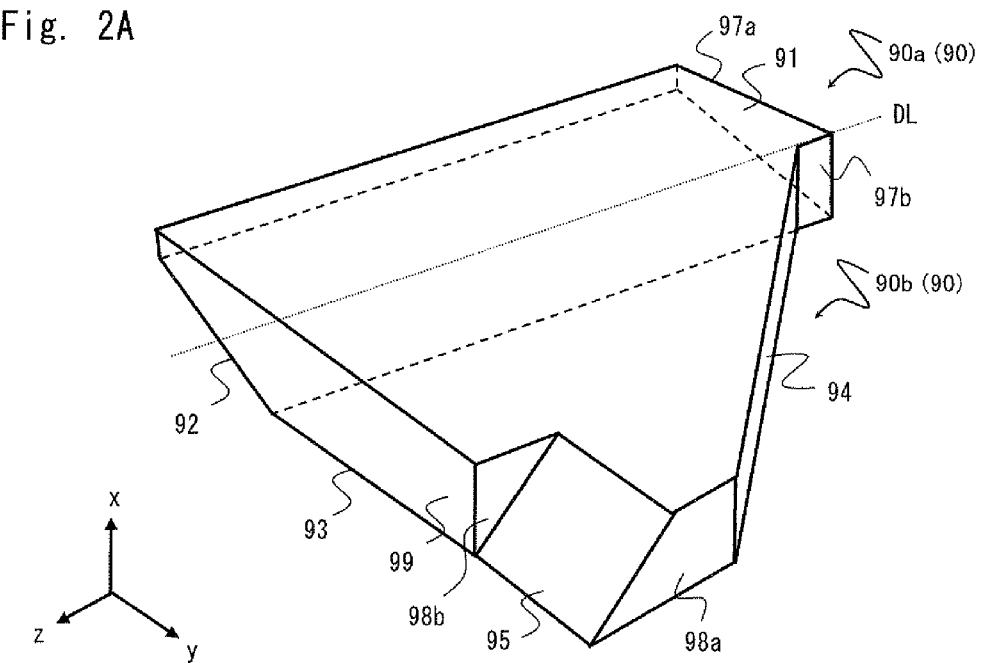
FIG. 2A is a schematic diagram showing a structure of a light guide according to the first embodiment of the present invention.
Figure 2B:
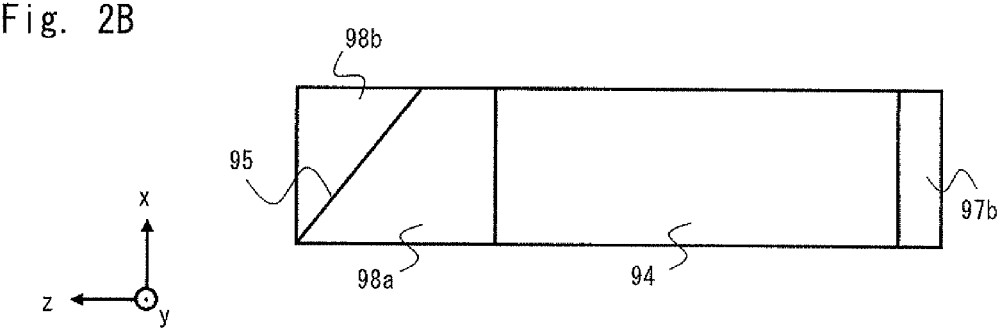
FIG. 2B is a schematic diagram showing the structure of the light guide according to the first embodiment of the present invention.
Figure 2C:
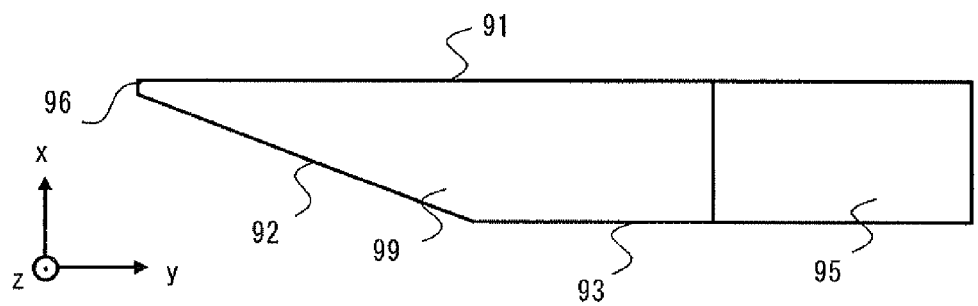
FIG. 2C is a schematic diagram showing the structure of the light guide according to the first embodiment of the present invention.
Figure 3:
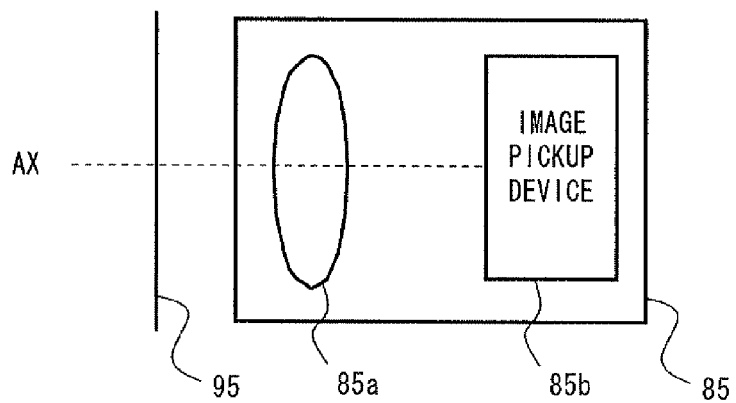
FIG. 3 is a schematic diagram showing a structure of an image pickup unit according to the first embodiment of the present invention.
Figure 4:
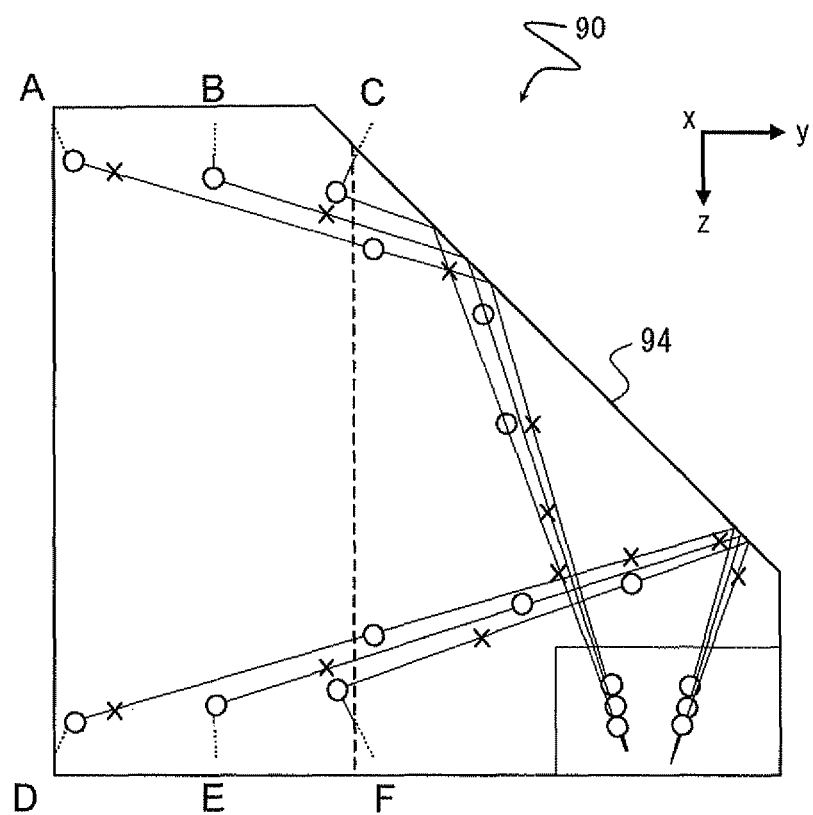
FIG. 4 is a schematic explanatory diagram illustrating functions of the light guide according to the first embodiment of the present invention.
Figure 5:
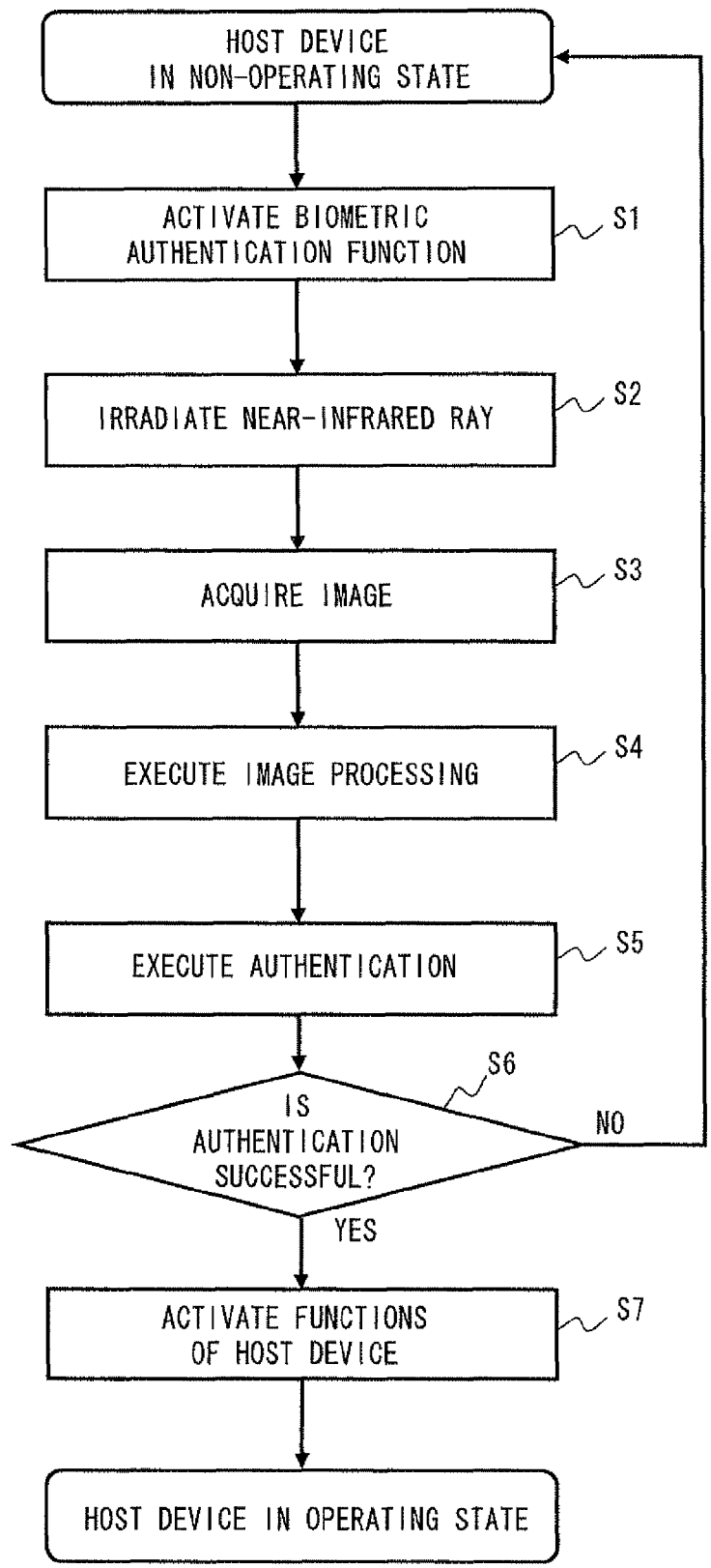
FIG. 5 is a flowchart illustrating operation of the biometric authentication apparatus according to the first embodiment of the present invention.

A first embodiment of the present invention will be described with reference to FIGS. 1 to 5. FIG. 1 is a schematic explanatory diagram showing a schematic structure of a biometric authentication apparatus. FIGS. 2A to 2C are schematic diagrams each showing a structure of a light guide. FIG. 3 is a schematic diagram showing a structure of an image pickup unit. FIG. 4 is a schematic explanatory diagram illustrating functions of a light guide. FIG. 5 is a flowchart illustrating operation of the biometric authentication apparatus.

As shown in FIG. 1, a biometric authentication apparatus 10 includes a light source 50, a controller 52, a biometric information acquisition apparatus 55, and an authentication unit 60. The biometric authentication apparatus 10 is connected to a host device 65. Further, as shown in FIG. 1, the biometric information acquisition apparatus 55 includes an image pickup unit 85 and a light guide 90.

The biometric authentication apparatus 10 is embedded in a host device such as a cellular phone. The operating state of the host device is determined based on an authentication result obtained by the biometric authentication apparatus 10. For instance, when the biometric authentication apparatus 10 determines that the authentication is successful, the biometric authentication apparatus 10 outputs an authentication success signal, and the host device transitions from a non-operating state to an operating state. When the biometric authentication apparatus 10 determines that the authentication is unsuccessful, the biometric authentication apparatus 10 outputs an authentication failure signal to the host device 65, and the host device remains in the non-operating state. In this manner, confidential information within the host device can be protected by embedding the biometric authentication apparatus 10 into the host device.

The connection relationships are as follows. The controller 52 is connected to each of the light source 50, the image pickup unit 85, and the authentication unit 60. The light guide 90 is optically connected to the image pickup unit 85. An output of the image pickup unit 85 is connected to the authentication unit 60. The authentication unit 60 and the host device 65 are interconnected.

The light source 50 emits light of wavelengths ranging from a near-infrared region to an infrared region, for example, in response to a control signal from the controller 52. The light source 50 is a semiconductor light-emitting element (wavelengths of emitted light are 760 nm, 850 nm, 870 nm, 950 nm, etc.) in which a monolithic semiconductor element is packaged with a resin, for example. By allowing a current to flow through the semiconductor light-emitting element, the semiconductor light-emitting element emits light of a predetermined wavelength. To acquire a fingerprint image, the light source 50 may emit visible light.

The controller 52 controls the operating states of the light source 50, the image pickup unit 85, and the authentication unit 60. The controller 52 may be omitted by incorporating the functions of the controller into the authentication unit. In this case, the functions of the controller would be achieved by a program or glue logic of an arithmetic processing unit such as a CPU built in the authentication unit.

The light guide 90 is provided in front of the image pickup unit 85. The light guide 90 is a light guide that reduces an input image in its size and outputs it to the image pickup unit 85. The light guide 90 is a plate-like member which is substantially transparent with respect to the emitted light (in this case, near-infrared ray) from the light source 50.

As shown in FIG. 1, the light guide 90 includes a light beam introducing portion 90a and a light beam reflexing portion 90b. The light beam introducing portion 90a is provided with an image input area Rin to which a vein image is input. The light beam reflexing portion 90b has a side surface 94 which extends in a thickness direction of the light guide 90 and functions as a reflective surface. Even when the width of the light guide 90 along a z-axis would be enlarged by providing the side surface 94, the light guide 90 would be prevented from being elongated along a y-axis. This will be apparent from the description of a second embodiment and a reference example to be described later.

The light guide 90 is made of resin, glass, or the like. In the case of producing the light guide 90 using resin, resin materials such as acryl, polycarbonate, cycloolefin polymer, transparent polyimide, polyethylene, and polypropylene may be used.

Referring to FIGS. 2A to 2C, the structure of the light guide 90 is described.

As shown in FIGS. 2A to 2C, the light guide 90 includes a front surface 91, a back surface (light reflective surface) 92, the side surface 94 (light reflective surface), and a side surface (light exit surface) 95. The light guide 90 further includes a back surface 93, a side surface 96, a side surface 97a, a side surface 97b, a side surface 98a, a side surface 98b, and a side surface 99.

The light guide 90 totally reflects a light beam on an interface between the light guide and air. In the process of propagating the light beam in the light guide 90, a vein image input to the image input area Rin is reduced in its size and output from the side surface 95. The angle between the side surface 94 and a boundary DL between the light beam introducing portion 90a and the light beam reflexing portion 90b is 45 degrees. The side surface 94 is perpendicular to the front surface 91.

The light guide 90 firstly reflects the incident light beam along an x-axis on the back surface 92 to propagate the incident light beam along the y-axis direction. Then, the light guide 90 reflects the propagating light on the side surface 94 to propagate the light along the z-axis direction. Thus, even in the case of acquiring a vein image having a large width along the z-axis, the light guide 90 can be prevented from being elongated along the y-axis. As a result, images can be obtained under desired conditions without increasing the size of the light guide 90. The vein image is reduced in its size through the process of guiding the incident light beam by the light guide 90. Accordingly, compared with the case in which the light guide 90 is not provided, the size of the image pickup unit 85 can be reduced. In the process of propagating the light in the light guide 90, the propagating light is propagated while being totally reflected on the front surface 91 and the back surface 93. The light guide 90 is optically designed to satisfy the total reflection conditions, thereby making it possible to reduce a propagation loss of light in the light guide 90 and to obtain a high-quality vein image.

On a portion of the front surface 91 other than the image input area Rin, a metal reflective film or a light reflective layer having wavelength selectivity may be formed. In the case of forming the light reflective layer having reflectivity to light with a wavelength of light emitted from the light source 50, light of unnecessary wavelengths can be emitted to the outside of the light guide 90. This results in an improvement in quality of a vein image to be acquired. Similarly, a metal reflective film or a light reflective layer having wavelength selectivity may be formed on the back surface 92, the back surface 93, and the side surface 93, each of which functions as a reflective surface.

When the metal reflective film is formed on the surface of the light guide 90, electrostatic charge becomes a problem. When the light guide 90 is optically designed to satisfy the total reflection conditions, the electric charge poses no problem. The same holds true in the case where the light reflective layer having wavelength selectivity is formed. When no metal reflective film is formed, the electric charge is discharged to each of the controller 52, the authentication unit 60, and the image pickup unit 85, thereby preventing electrostatic breakdown of these electronic components.

Referring to FIG. 3, the image pickup unit 85 shown in FIG. 1 includes a lens 85a and an image pickup device 85b. The optical axis of the lens 85a is set to be perpendicular to the side surface 95. The lens 85a functions as a condenser lens, and reduces and outputs the input vein image. The image pickup device 85b is a typical image pickup device such as a thin film transistor (TFT), a complementary metal oxide semiconductor (CMOS), or a charge coupled device (CCD). The image pickup device 85b includes pixels arranged in a matrix form. The image pickup device 85b generates an electric signal corresponding to the amount of incident light in each pixel, thereby capturing a vein image. The image pickup device 85b captures the vein image based on the control signal from the controller 52, and outputs the picked-up image to the authentication unit 60.

The authentication unit 60 shown in FIG. 1 executes authentication based on comparison between the vein image captured by the image pickup unit 85 and a prestored vein image based on the control signal from the controller 52, and outputs an authentication result to the host device 65. The detailed operations of the authentication unit 60 are arbitrary. The authentication unit 60 may execute authentication by extracting feature points from the images to be compared and determining whether these feature points are identical or similar to each other. The authentication unit 60 is implemented by executing a program stored in a recording medium, such as a hard disk, in an arithmetic processing unit such as a CPU. Alternatively, the authentication unit 60 may also be implemented by hardware processing such as glue logic.

Referring now to FIG. 4, the functions of the light guide 90 are described.

Reference symbols A, B, C, D, E, and F in FIG. 4 denote object points. As shown in FIG. 4, light from each object point propagates through a prism. In this case, in optical paths from the object points, each reflecting point on the back surfaces 92 and 93 is represented by "○", and each reflecting point on the front surface 91 is represented by "x". Referring to FIG. 4, the reflecting position on the side surface 94 varies among the object points. For instance, light from the object point A is reflected on the back surface 92, the front surface 91, the back surface 93, the side surface 94, the front surface 91, and the back surface 93 in this order, and exits from the side surface 95. Light from the object point C is reflected on the back surface 92, the side surface 94, the front surface 91, and the back surface 93 in this order, and exits from the side surface 95. In this manner, the incident light propagates through the light guide 90 along different optical paths according to the incident positions in the image input area Rin. Also in this case, the optical paths have the same number of reflections on the front surface and the same number of reflections on the back surface. In addition, the light is always reflected on the side surface 94.

Lastly, referring to FIG. 5, the operation of the biometric authentication apparatus 10 is described.

Firstly, the biometric authentication function is activated (S1) to thereby activate the biometric authentication apparatus 10. A specific method of activating the biometric authentication apparatus 10 is arbitrary. A start switch connected to the controller 52 may be provided in the biometric authentication apparatus 10, and the biometric authentication function may be activated by pressing the start switch.

Next, a near-infrared ray is irradiated onto a human finger (S2). Specifically, the light source 50 irradiates a near-infrared ray onto the human finger, which is placed on the front surface 91 of the light guide 90, in response to the control signal from the controller 52. The near-infrared ray irradiated onto the human finger is diffused in the human finger. The near-infrared ray is absorbed in portions corresponding to the positions of veins of the human. A vein image can be acquired by capturing the light transmitted through the human finger.

Then, an image is acquired (S3). Specifically, the image pickup unit 85 captures the vein image output from the light guide 90 in response to the control signal from the controller 52.

Then, image processing is executed (S4). Specifically, the authentication unit 60 executes image processing (e.g., distortion correction processing) on the image data output from the image pickup unit 85, in response to the control signal from the controller 52.

Then, authentication is executed (S5). Specifically, the authentication unit 60 compares the image data acquired at this time with prestored image data in response to the control signal from the controller 52, and determines whether the human inspected at this time matches a registered human.

When the authentication is successful, the functions of the host device are activated (S7). When the authentication is successful, the authentication unit 60 outputs an authentication success signal to the host device 65. The host device 65 activates a specific function based on the authentication success signal from the authentication unit 60. Thus, the host device transitions from the non-operating state to the operating state. When the authentication is unsuccessful, the host device remains in the non-operating state.

Second Embodiment

Figure 6A:
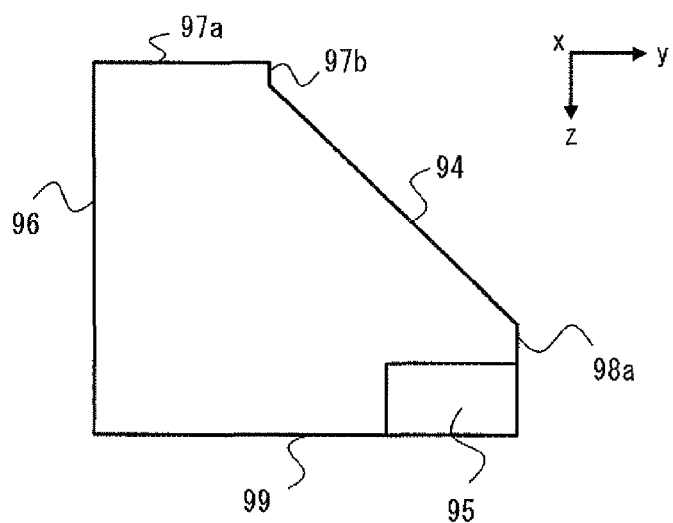
FIG. 6A is a schematic diagram illustrating a variation of a light guide 90 according to a second embodiment of the present invention.
Figure 6B:
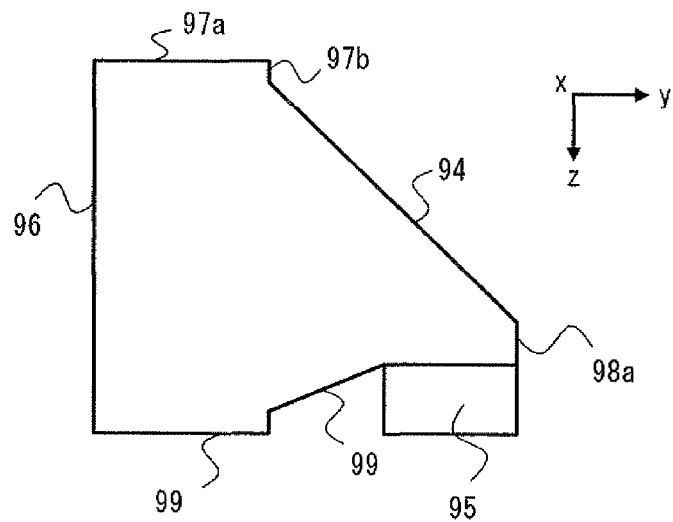
FIG. 6B is a schematic diagram illustrating a variation of the light guide 90 according to the second embodiment of the present invention.
Figure 6C:
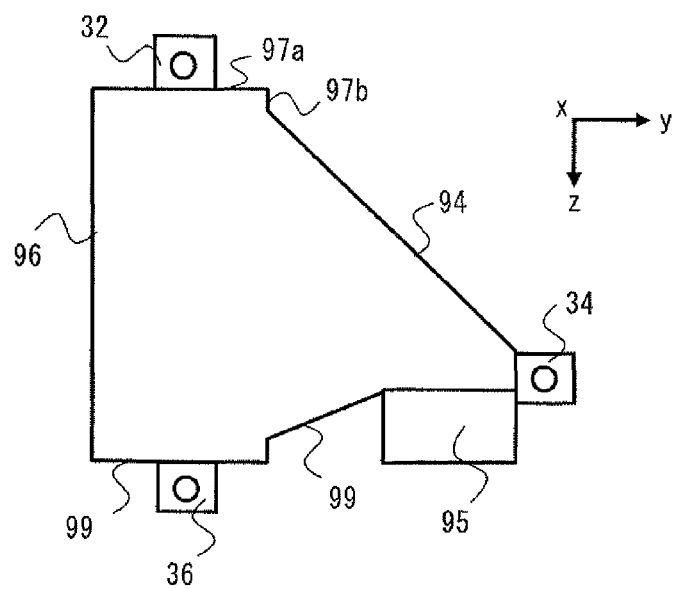
FIG. 6C is a schematic diagram illustrating a variation of the light guide 90 according to the second embodiment.

Referring to FIGS. 6A to 6C, a second embodiment of the present invention is described. FIGS. 6A to 6C are schematic diagrams illustrating variations of the light guide 90.

In place of the light guide shown in FIG. 6A, the light guide 90 shown in FIGS. 6B and 6C may be employed. Also in such a case, the same effects as those of the first embodiment can be obtained.

As shown in FIG. 6B, an unnecessary portion which does not transmit the propagating light may be partially removed from the light guide 90, depending on the optical path along which the light incident on the image input area Rin propagates in the light guide 90. This allows further downsizing of the light guide 80.

As is obvious from FIG. 6B, the light beam reflexing portion 90b has a portion which becomes narrower as being away from the light beam introducing portion 90a and which is positioned between the light beam introducing portion 90a and the side surface 95.

As shown in FIG. 6C, structures 32, 34, and 36 for attaching the light guide 90 to a housing or the like may be formed on a side surface which does not function as a reflective surface. Consequently, the light guide 90 can easily be fixed to other members without impairing the optical characteristics of the light guide 90.

Third Embodiment

Figure 7A:
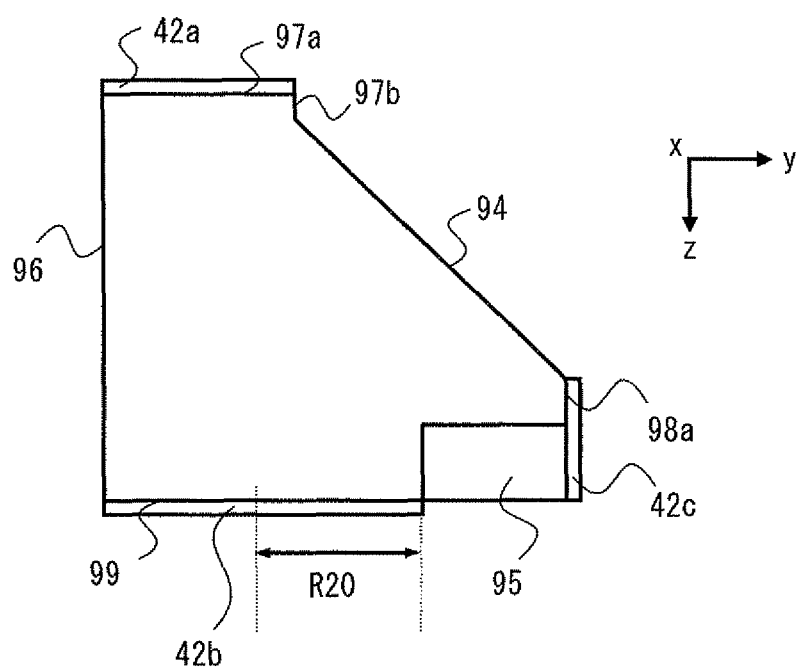
FIG. 7A is a schematic diagram illustrating a variation of the light guide 90 according to a third embodiment of the present invention.
Figure 7B:
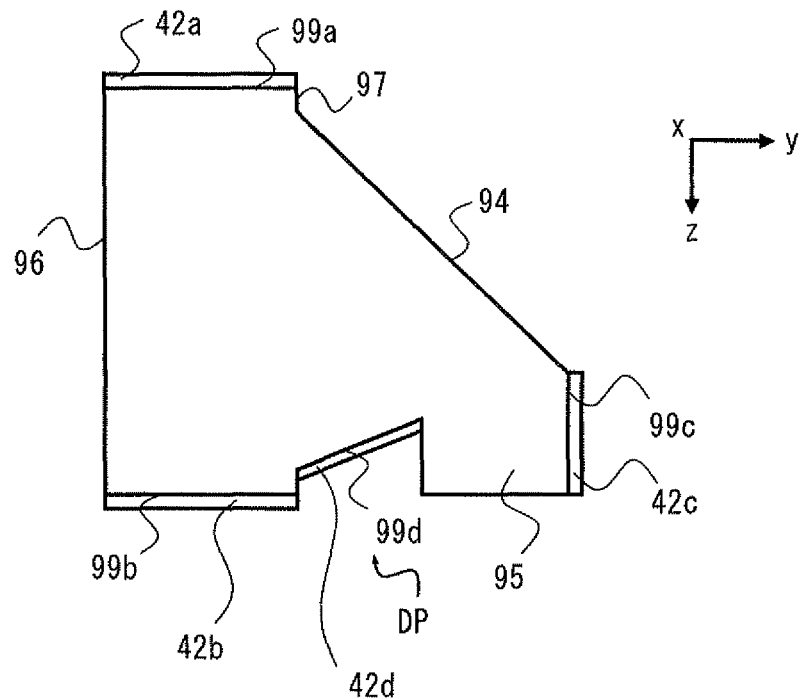
FIG. 7B is a schematic diagram illustrating a variation of the light guide 90 according to the third embodiment of the present invention.

Referring to FIGS. 7A and 7B, a third embodiment of the present invention is described. FIGS. 7A and 7B are schematic diagrams illustrating variations of the light guide 90.

As shown in FIGS. 7A and 7B, black layers (light-absorbing layers 42a to 42d) may be formed on a side surface which does not function as a reflective surface. Also in such a case, the same effects as those of the above embodiments can be obtained.

The formation of the black layers on the side surface which does not function as a reflective surface prevents unwanted light from being reflected on the side surface. This makes it possible to suppress degradation in quality of the acquired vein image due to unwanted reflection.

The black layer 42b is preferably formed within a range R20 shown in FIG. 7A. This makes it possible to effectively reduce unwanted light generated in the light guide 90. Moreover, it is possible to acquire an excellent vein image and to achieve highly accurate biometric authentication.

Reference Example

Hereinafter, a reference example is described with reference to FIGS. 8A and 8B and FIGS. 9A and 9B. FIGS. 8A and 8B and FIGS. 9A and 9B are schematic diagrams each showing a biometric information acquisition apparatus according to the reference example.

Figure 8A:
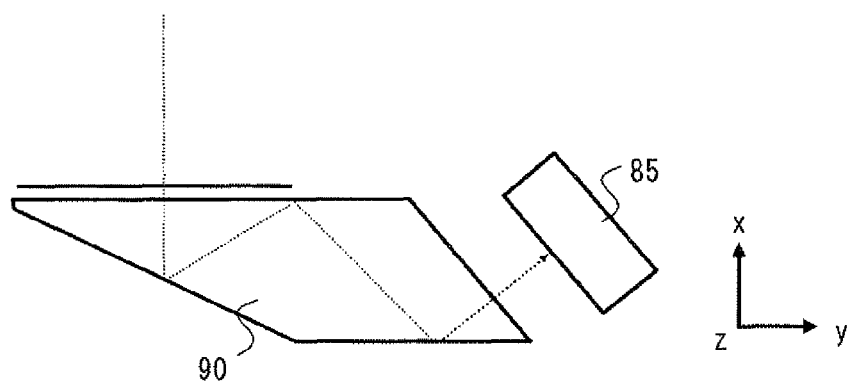
FIG. 8A is a schematic diagram showing a biometric information acquisition apparatus according to a reference example of the present invention.
Figure 8B:
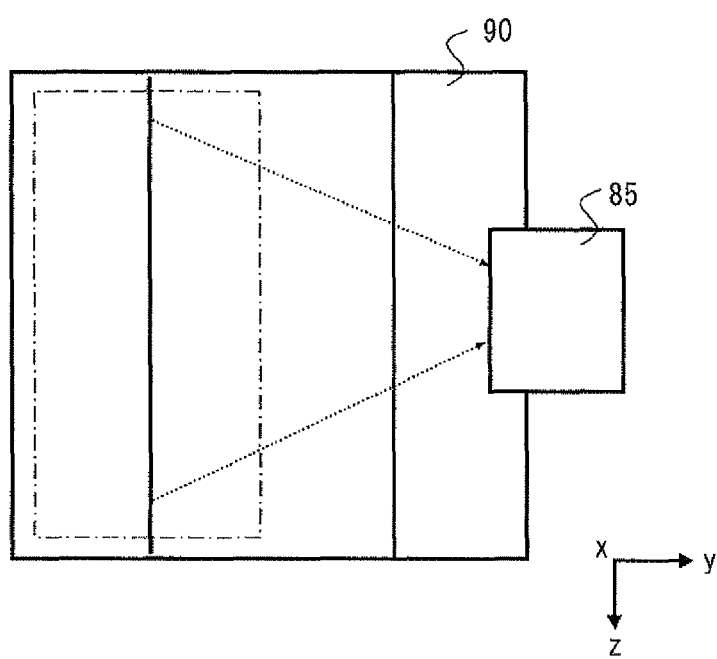
FIG. 8B is a schematic diagram showing the biometric information acquisition apparatus according to the reference example of the present invention.

As shown in FIGS. 8A and 8B, the light guide 90 guides a light beam by reflection between the front surface and the back surface. The light guide 90 is interposed to avoid an increase in size of the apparatus and to ensure the necessary optical path length.

Figure 9A:
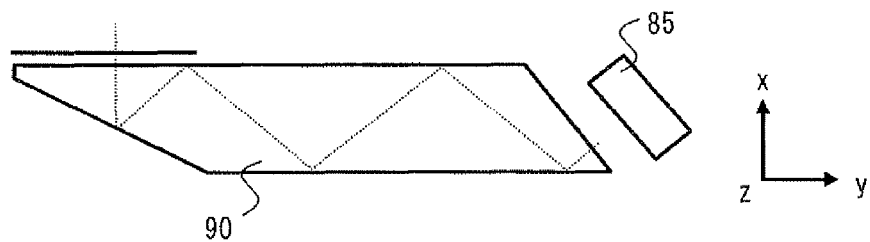
FIG. 9A is a schematic diagram showing the biometric information acquisition apparatus according to the reference example of the present invention.
Figure 9B:
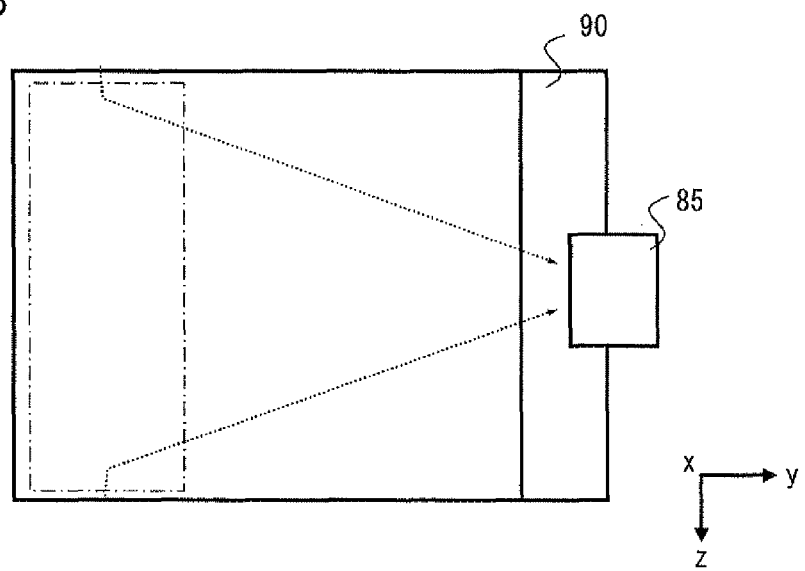
FIG. 9B is a schematic diagram showing the biometric information acquisition apparatus according to the reference example of the present invention.

However, in the case of enlarging the width along the z-direction of the light guide 90 in order to capture a vein image in a wider range, it becomes necessary to enlarge the width along the y-axis of the light guide 90. Specifically, as shown in FIGS. 9A and 9B, it becomes necessary to enlarge the width along the y-axis of the light guide 90. This is because the optical path length required for reducing the vein image increases as the acquired vein image is enlarged.

As described above, in this embodiment, the light guide 90 has the side surface 94. This makes it possible to avoid an increase in the width along the y-axis of the light guide 90 as in the reference example. In other words, even in the case of enlarging the acquired vein image, it is possible to avoid an increase in size of the light guide 90.

The technical scope of the present invention is not limited to the above embodiments. The specific shape of the light guide is arbitrary. The acquired vein image may be distorted in the process of guiding a light beam in the light guide. The distortion generated in the acquired image in this case may be eliminated by image processing. A method of attaching the lens and image pickup device to the light guide is arbitrary. The light guide is preferably placed in a housing so as to prevent unwanted extraneous light from being incident on the light guide.

INDUSTRIAL APPLICABILITY

In a biometric information acquisition apparatus having an optical system for image transfer, a subject image can be captured within a desired range, while suppressing an increase in size of the biometric information acquisition apparatus.

REFERENCE SIGNS LIST

10 BIOMETRIC AUTHENTICATION APPARATUS
50 LIGHT SOURCE
52 CONTROLLER
55 BIOMETRIC INFORMATION ACQUISITION APPARATUS
60 AUTHENTICATION UNIT
65 HOST DEVICE
85 IMAGE PICKUP UNIT
85*a* LENS
85*b* IMAGE PICKUP DEVICE
90 LIGHT GUIDE
90*a* LIGHT BEAM INTRODUCING PORTION
90*b* LIGHT BEAM REFLEXING PORTION
91 FRONT SURFACE
92 BACK SURFACE
93 BACK SURFACE
94 SIDE SURFACE
95 SIDE SURFACE
96 SIDE SURFACE
97*a* SIDE SURFACE
97*b* SIDE SURFACE
98*a* SIDE SURFACE
98*b* SIDE SURFACE
99 SIDE SURFACE
42*a*-42*d* LIGHT-ABSORBING LAYER

The invention claimed is:

1. A biometric information acquisition apparatus comprising:
    a light guide that guides a light beam through a plurality of light reflective surfaces; and
    an image pickup unit that receives the light beam output from the light guide and captures a subject image, wherein
    the light guide has a flat-plate shape as a whole,
    the light guide comprises an upper surface including an input area that receives the subject image,
    when a direction perpendicular to the upper surface is defined as an x-axis direction and two axes orthogonal to each other within a plane perpendicular to the x-axis are defined as a y-axis and a z-axis,
    the light guide further comprises:
        a first light reflective surface that reflects light incident from the input area along the x-axis so as to include at least a y-axis direction component; and
        a second light reflective surface that reflects the light reflected by the first light reflective surface and having the y-axis direction component so as to include at least a z-axis direction component, and
    the first light reflective surface and the second light reflective surface form a part of an external surface of the light guide.

2. The biometric information acquisition apparatus according to claim 1, wherein
    the light guide is configured such that the upper surface including the input area further reflects the light reflected by the first light reflective surface.

3. The biometric information acquisition apparatus according to claim 2, wherein
    the first light reflective surface is parallel to the z-axis and intersects with the x-axis, and
    the second light reflective surface is parallel to the x-axis and intersects with the y-axis.

4. The biometric information acquisition apparatus according to claim 3, wherein
    the light guide causes the light incident from the upper surface along the x-axis to be reflected inside a plurality of times and temporarily guided in the y-axis direction, and then causes the light to finally exit along the z-axis direction.

5. The biometric information acquisition apparatus according to claim 2, wherein
    the light guide comprises a light exit surface being parallel to the y-axis direction and intersecting with the z-axis direction, and
    a light-absorbing layer is at least partially formed on a side surface of the light guide, excluding the second light reflective surface and the light exit surface.

6. The biometric information acquisition apparatus according to claim 2, wherein
    the light guide comprises a light exit surface being parallel to the y-axis direction and intersecting with the z-axis direction, and
    the image pickup unit comprises:
        a lens opposed to the light exit surface; and
        an image pickup device that receives a light beam incident through the lens and captures the subject image.

7. The biometric information acquisition apparatus according to claim 1, wherein the light guide is narrowed with distance from the input area along the y-axis when viewed along the x-axis direction.

8. A biometric authentication apparatus comprising:
    a light guide that guides a light beam through a plurality of light reflective surfaces;
    an image pickup unit that receives the light beam output from the light guide and captures a subject image; and
    an authentication execution unit that executes authentication based on comparison between the subject image captured by the image pickup unit and a prestored image, wherein
    the light guide has a flat-plate shape as a whole,
    the light guide comprises an upper surface including an input area that receives the subject image,
    when a direction perpendicular to the upper surface is defined as an x-axis direction and two axes orthogonal to each other within a plane perpendicular to the x-axis are defined as a y-axis and a z-axis,
    the light guide further comprises:
        a first light reflective surface that reflects light incident from the input area along the x-axis so as to include at least a y-axis direction component; and a second light reflective surface that reflects the light reflected by the first light reflective surface and having the y-axis direction component so as to include at least a z-axis direction component, and the first light reflective surface and the second light reflective surface form a part of an external surface of the light guide.

9. A light guide that has a flat-plate shape as a whole and comprises an upper surface including an input area that receives the subject image, wherein when a direction perpendicular to the upper surface is defined as an x-axis direction and two axes orthogonal to each other within a plane perpendicular to the x-axis are defined as a y-axis and a z-axis, the light guide further comprises:
- a first light reflective surface that reflects light incident from the input area along the x-axis so as to include at least a y-axis direction component; and
- a second light reflective surface that reflects the light reflected by the first light reflective surface and having the y-axis direction component so as to include at least a z-axis direction component, and
- the first light reflective surface and the second light reflective surface form a part of an external surface of the light guide.

10. An image acquisition apparatus comprising:

a light guide that guides a light beam through a plurality of light reflective surfaces; and an image pickup unit that receives the light beam output from the light guide and captures a subject image, wherein the light guide has a flat-plate shape as a whole, the light guide comprises an upper surface including an input area that receives the subject image, when a direction perpendicular to the upper surface is defined as an x-axis direction and two axes orthogonal to each other within a plane perpendicular to the x-axis are defined as a y-axis and a z-axis, the light guide further comprises:
- a first light reflective surface that reflects light incident from the input area along the x-axis so as to include at least a y-axis direction component; and
- a second light reflective surface that reflects the light reflected by the first light reflective surface and having the y-axis direction component so as to include at least a z-axis direction component, and the first light reflective surface and the second light reflective surface form a part of an external surface of the light guide.

* * * * *